United States Patent [19]

Suzuki

[11] Patent Number: 4,817,073
[45] Date of Patent: Mar. 28, 1989

[54] TRACKING SERVO SYSTEM FOR AN INFORMATION RECORDING DISC PLAYER

[75] Inventor: Masanori Suzuki, Tokorozawa, Japan

[73] Assignee: Pioneer Electronic Corporation, Tokyo, Japan

[21] Appl. No.: 58,144

[22] Filed: Jun. 4, 1987

[30] Foreign Application Priority Data

Jun. 6, 1986 [JP] Japan .................................. 61-131551

[51] Int. Cl.$^4$ ........................ G11B 7/095; G11B 21/08
[52] U.S. Cl. ........................................ 369/46; 358/907; 369/30
[58] Field of Search ...................... 369/44, 45, 46, 124, 369/43, 30, 32; 358/907, 342

[56] References Cited

U.S. PATENT DOCUMENTS

| | | | |
|---|---|---|---|
| 4,613,963 | 9/1986 | Hirano | 369/44 |
| 4,677,602 | 6/1987 | Okano et al. | 369/32 |
| 4,698,795 | 10/1987 | Yoshio | 369/44 |
| 4,698,796 | 10/1987 | Kimura | 369/44 |

*Primary Examiner*—Donald McElheny, Jr.
*Attorney, Agent, or Firm*—Fleit, Jacobson, Cohn & Price

[57] ABSTRACT

A tracking servo system for use in an information recording disc player including an equalizing circuit for compensating a frequency characteristic of a tracking error signal generated at a pickup of the disc player. The equalizing characteristic of the equalizing circuit is changed for a predetermined time period after the servo loop is closed during a track jump operation of the disc player. By this feature the servo loop is locked in when a decelerating force is exerted on the actuator of the tracking servo system, thereby to increase the stability of the lock in of the tracking servo system.

3 Claims, 3 Drawing Sheets

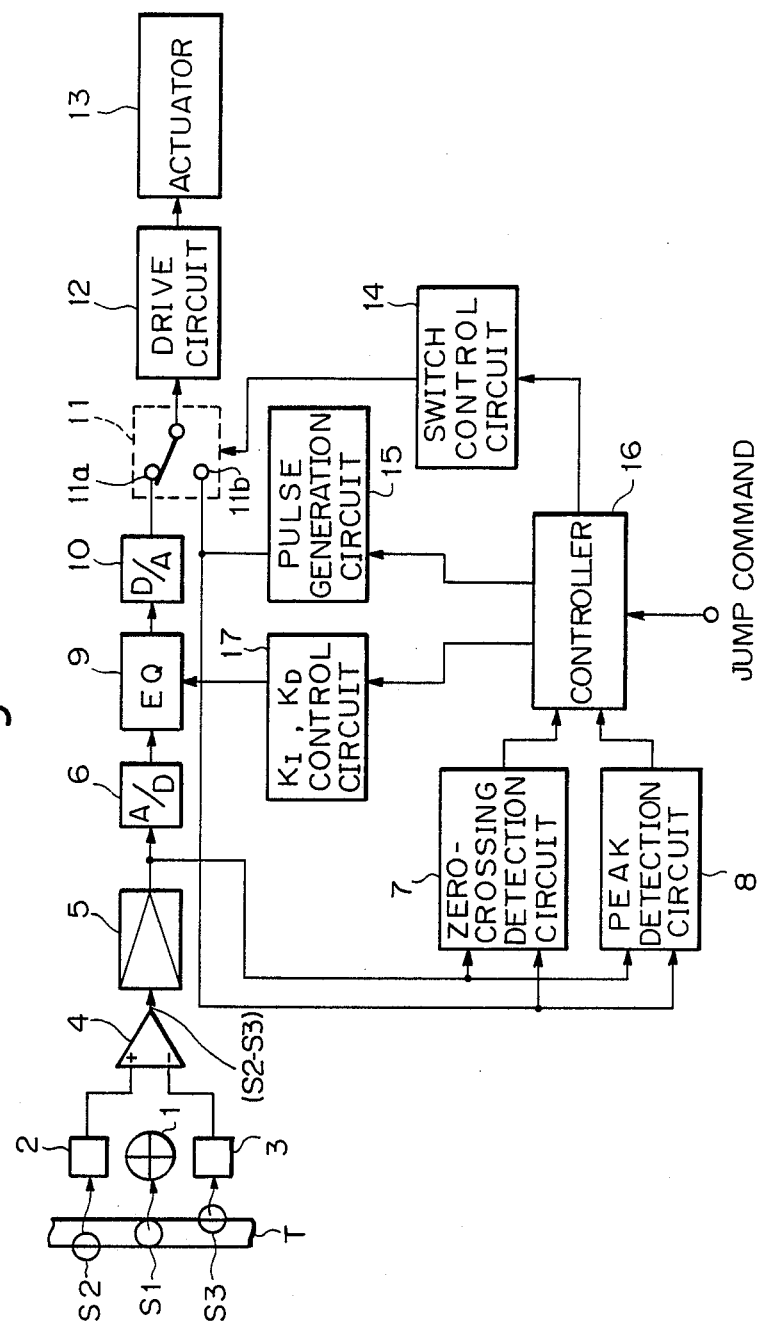

Fig. 2A
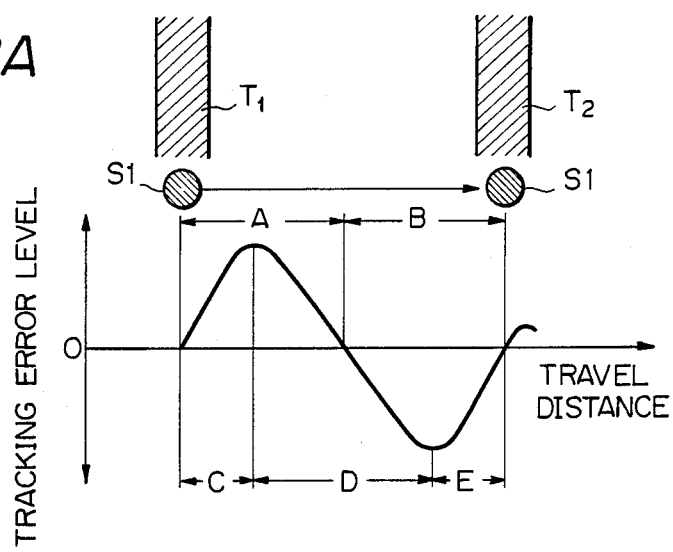
Fig. 2B
Fig. 3
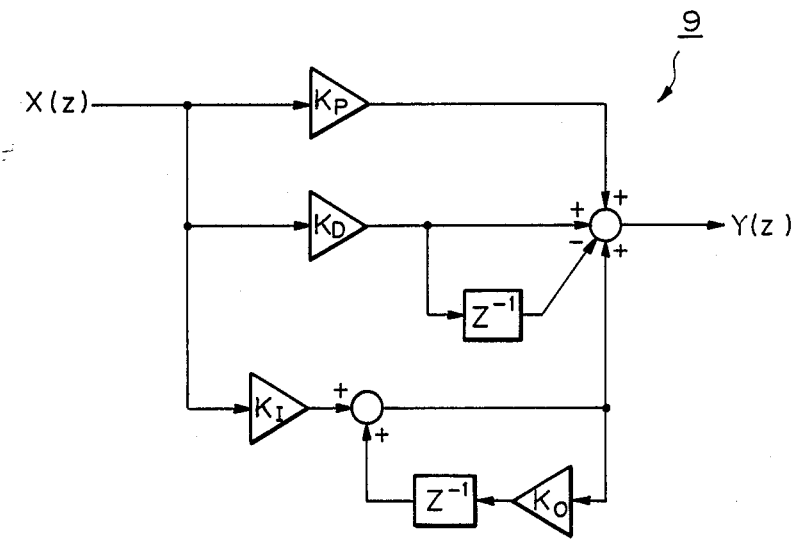

Fig. 4
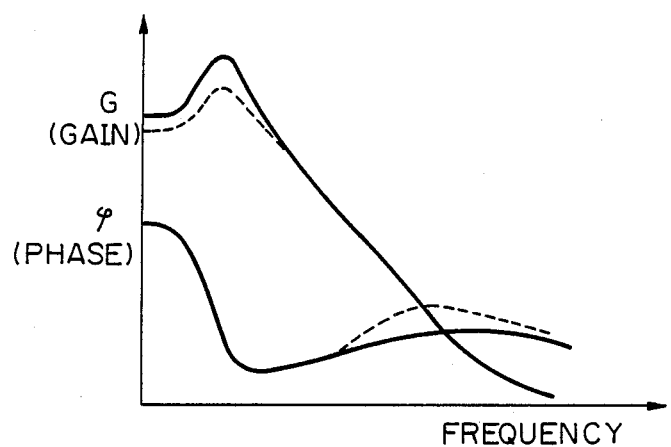
Fig. 5A
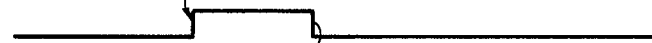
Fig. 5B
Fig. 5C
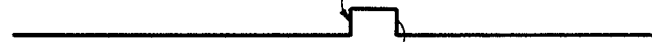
Fig. 5D
Fig. 5E
Fig. 5F

TRACKING SERVO SYSTEM FOR AN INFORMATION RECORDING DISC PLAYER

BACKGROUND OF THE INVENTION

1. Field of the Invention

The present invention relates to a tracking servo system for une in an information recording disc playing system.

2. Description of Background Information

A tracking servo system is indispensable in a system for playing an information recording disc such as a video disc or a digital audio disc (hereinafter, simply referred to as a disc) in order to control the position of the information reading light spot so that it always accurately traces a recording track formed on the disc even if the disc is slightly eccentric.

The tracking servo system forms the so called closed loop control system in which a tracking error signal corresponding to an amount of deviation of the information reading light spot with respect to the recording track of the disc is generated and an actuator for deflecting the information reading spot in a radial direction of the disc is driven in accordance with the tracking error signal, thereby to control the position of the information reading light spot with respect to the recording track.

Furthermore, in such a servo system, during a track jump operation in which the information reading point is moved across the tracks the control operation is performed such that the servo loop is opened and jump pulses are applied to the tracking actuator, and subsequently the servo loop is closed at a suitable timing, so that the servo loop is locked in quickly.

In such a tracking servo system, an equalizing circuit capable of a proportional integral differential (PID) operation is incorporated in the servo loop, and the stabilization of the servo loop is attained by the operation of the equalizing circuit. An example of the gain and phase characteristics of the equalizing circuit is illustrated in FIG. 4 as servo open loop characteristics. As shown, the compensation operation of the equalizer is such that the gain at the low frequency range is boosted by an integration coefficient so as to improve the traceability of the pickup against the eccentricity of the disc. Furthermore, the phase advance is compensated for by means of the differential coefficient. However, the compensation operation is attained primarily by the integration component.

With this type of control system in which the integration component is principal, if it is assumed that the light spot S1 for reading information is moved while the tracking servo loop is closed, the tracking error signal after passing through the equalizing circuit effects an acceleration operation to the actuator during a first half period of a track tack jump operation shown as a period A in FIG. 2B, and a deceleration operation to the actuator during a last half period of the track jump operation shown as a period B in FIG. 2B. This results in that the lock in of the servo loop is performed during the acceleration drive of the actuator. However, this will cause a large overshoot, and the lock in of the servo system will become unstable.

OBJECT AND SUMMARY OF THE INVENTION

An object of the present invention is therefore to provide a tracking servo system in which the lock in of the servo loop is stably and certainly performed at the time of the track jump operation.

In the tracking servo system according to the present invention, the equalizing characteristic of the equalizer is changed for a predetermined time period after the closure of the servo loop during a track jump operation. More particularly, in an embodiment of the present invention, the integration and differential coefficients which determine the chatacteristic of the equalizer for compensating the frequency characteristic of the tracking error signal are made variable, and the integration coefficient is made small and the differential coefficient is made large for a predetermined time period after the closing of the servo loop during the track jump operation.

BRIEF DESCRIPTION OF THE DRAWINGS

FIG. 1 is a block diagram showing an embodiment of the tracking servo system according to the present invention;

FIGS. 2A and 2B are diagrams showing the relationship between the position of the light spot for reading the information and the tracking error signal;

FIG. 3 is a block diagram showing an example of the construction of the digital equalizater incorporated in the system shown in FIG. 1;

FIG. 4 is a diagram showing an open loop characteristic of the tracking servo system; and FIGS. 5A through 5F are timing charts illustrating the waveforms of signals at various point in the tracking servo system shown in FIG. 1.

DETAILED DESCRIPTION OF A PREFERRED EMBODIMENT

FIG. 1 is a block diagram showing an embodiment of the tracking servo system according to the present invention.

As shown, three light spots obtained by converging a laser beam, i.e. a light spot S1 for reading information and a pair of light spots S2 and S3 for sensing tracking information, which are preceding and following the light spot S1 respectively while a relative movement between the light spots and the disc occurs, are irradiated from a pickup (not shown) against a recording track T of the disc in such a manner as shown in FIG. 1. The refelection of these light spots are received by photoelectric converting units 1, 2 and 3 incorporated in the pickup.

The photoelectric converting unit 1 is of a quadrant form which consists of four independent light receiving elements bounded by two boundary lines crossing sustantially at right angles with each other in the light receiving surface. A summation of output signals of these four light receiving elements forms a playback RF (Radio Frequency) signal. On the other hand, a pair of output signals of the photo electric converting units 2 and 3 are supplied to a differential amplifier 4 in which a signal (S2-S3) indicative of a difference between the output signals of the photoelectric converting units 2 and 3 is generated, and the signal (S2-S3) forms the tracking error signal. When the light spots S1 through S3 move from a recording track T1 to an adjacent recording track T2 by a track jump operation as shown in FIG. 2A, the tracking error signal (S2-S3), will have a sinusoidal waveform as shown in FIG. 2B. Thus the level of the tracking signal (S2-S3) becomes proportional to the deviation of the position of the light spot S1 for reading the information from the recording track T, and zero-crossing points of the tracking error signal (S2-S3) correspond to a position of each recording track T (T1 or T2) and a position between the recording tracks T1 and T2.

The tracking error signal is supplied to an error amplifier 5 in which it is amplified and in turn supplied to an A/D (Analog to Digital) converter 6, a zero-crossing detection circuit 7 and a peak detection circuit 8. At the A/D converter 6, the tracking error signal is converted into digital form, and supplied to a digital equalizer 9 in which its frequency characteristic is compensated for, and supplied to a D/A (digital to Analog) converter 10 in which the tracking error signal in digital form is converted into analog form once more, and in turn supplied to a close contact 11a of a loop switch 11. An output signal of the loop switch is supplied to an actuator 13 of the pickup through a drive circuit 12. The actuator 13 is operative to deflect the light spot S1 in the radial direction of the disc so that the light spot S1 for reading information accurately traces the recording track T. The tracking servo loop is formed by the above described elements.

The switching operation of the loop switch 11 is controlled by means of a switch control circuit 14, and the servo loop closes when a movable contact of the loop switch 11 is positioned at the close contact 11a. Under the open loop condition in which the movable contact of the loop switch 11 is positioned at an open contact 11b, jump pulses of negative polarity for example and brake pulses of positive polarity for example are generated by a pulse generating circuit 15 at suitable intervals and supplied to the actuator 13. The track jump operation is performed in this way. The intervals or timings of the generation of jump pulses and brake pulses are controllted by a controller 16.

As shown in FIG. 2B, the zero-crossing detection circuit 7 detects the zero-crossing at the transition of the tracking error signal from positive to negative polarity, and supplies a detection output signal to the controller 16. On the other hand, the peak detection circuit 8 detects a state in which the tracking error signal has attained a negative peak level, and supplies a detection output signal to the controller 16. As the zero-crossing detection circuit 7 and the peak detection circuit 8, commercially available circuits having known circuit construction can be used. The controller 16 comprises a microprocessor and peripheral elements. At the track jump operation, the controller 16 supplies a change-over timing signal for the loop switch 11 to the switch control circuit 14, and timing signals for the generation of the jump pulses and the brake pulses to the pulse generating circuit 15 in accordance with a jump command signal from the outside (such as a control part of the disc playing system) and the detection output signals of the zero-crossing detection circuit 7 and the peak detection circuit 8.

The digital equalizer 9 effects compensation operations corresponding to proportional (P), integral (I), and differential (D) components of an input signal waveform.

FIG. 3 shows an example of the construction of this digital equalizer 9, which is known in the art. In FIG. 3, $K_P$, $K_I$, $K_D$, and $K_O$ represent the proportional coefficient, the integration coefficient, differentiation coefficient, and the incomplete integration coeeficient respectively. $Z^{-1}$ represents a previous sampling value.

If the input signal, the output signal, and the equalizing characteristic are expressed by X(z), Y(z), and EQ(z) respectively, the relation between the input signal and the output signal can be expressed by:

$$Y(Z) = EQ(Z) \cdot X(Z)$$

where EQ(Z) is further expressed by the following equation:

$$EQ(Z) = K_P + K_D \cdot (1 - Z^{-1}) + K_I / (1 - K_O \cdot Z^{-1})$$

FIG. 4 shows an open loop characteristic of the tracking servo system. In this characteristic, the differential coefficient $K_D$ bears the compensation operation of the phase advance in the high frequency range. On the other hand, the integration coefficient $K_I$ bears the compensation operation of of the gain boost in the low frequency range.

This digital equalizer 9 is constructed so that both of the integration coefficient $K_I$ and the differential coefficient $K_D$ determining the equalizing characteristic are variable between two values. More specifically, the integration coefficient $K_I$ and the differential coefocient $K_D$ respectively have two values of $K_{I1}$ and $K_{D1}$ by which the integration component plays a primary control part, and $K_{I2}$ ($<K_{I1}$) and $K_{D2}$ ($>K_{D1}$) by which the differential component plays the primary control part. In accordance with a command from the controller 16, a $K_I$, $K_D$ control circuit 17 is operated to select the coefficient values $K_{I1}$ and $K_{D1}$ during the normal operation, and the coefficient values $K_{I2}$ and $K_{D2}$ during a predetermined time period (described later) at the time of a track jump operation.

The operation of the circuit constructed as described above, at the time of the track jump operation will be described with reference to timing charts of FIGS. 5A through 5F hereinafter.

When the jump command is supplied to the contorller 16 from the outside, the controller 16 operates the switch control circuit 14 to change over the switch position of the loop switch 11 to the open contact 11b, and supplies a command to the pulse generating circuit 15 so that it generates a negative jump pulse (FIG. 5A). By this operation, as shown in FIG. 2A, the information reading spot S1 moves from the track T1 toward the track T2. While this movement of the information reading point occurs, the signal level of the tracking error signal varies, as shown in FIG. 2B, in the form of a sinusoidal wave in accordance with the movement of the information reading spot S1 with respect to the recording track T.

The zero-crossing detection circuit 7 generates an output signal (FIG. 5B) having the high level immediately after the extinction of the jump pulse (FIG. 5A), and a transition of the output signal (FIG. 5B) from the high level to the low level occurs when the zero-crossing of the tracking error signal occurs. Thus, the timing of the transition of the output signal (FIG. 5B) represents the timing of the detection of the zero-crossing. In response to the transition of the output signal (FIG. 5B) of the zero-crossing detection circuit 7 which represents the timing of the detection of the zero-crossing, the controller supplies a command to the pulse generation circuit 15 so that it generates a positive brake pulse (FIG. 5C). This brake pulse (FIG. 5C) is supplied to the acturator 13, to slow down the speed of the movement of the information reading point S1.

The peak detection circuit 8 generates an output signal (FIG. 5D) of the high level immediately after the extinction of the brake pulse (FIG. 5C), and a transition of the output signal (FIG. 5D) of the peak detection circuit 8 from the high level to the low level occurs when the negative peak of the tracking error signal is detected by the peak detection circuit 8. The timing of this transition of the output signal (FIG. 5D) of the peak detection circuit 8 represents the timing of the detection of the peak. In response to the transition of the output signal (FIG. 5D) of the peak detection circuit 8 representing the detection of the peak, the controller 16 operates the switch control circuit 11 to switch over the loop switch 11 to the close contact 11a. Moreover, a predetermined time period Ta from this time point, the controller 16 supplies a swich-over control signal (FIG. 5E) to the $K_I$, $K_D$ control circuit 17, so that the integration and differential coefficients $K_I$ and $K_D$ of the digital equalizer 9 are switched from values $K_{I1}$ and $K_{D1}$ to values $K_{I2}$ and $K_{D2}$. By this operation, the equalizer 9 will have the integration coefficient $K_I$ smaller than that in the normal playback operation and the differential coefficient $K_D$ larger than that in the normal playback operation. Thus, the differential component plays the primary part of the compensation characteristic under this condition.

The waveform of the signal supplied to the actuator 13 is shown in FIG. 5F. As shown, the actuator is supplied with the tracking error signal at first. When a jump command is supplied to the controller, the jump pulse of the negative porality and having a predetermined duration is supplied to the actuator. Subsequently, the brake pulse of the positive polarity is supplied to the actuator when the zero-crossing of the tracking error signal is detected. After the extinction of the brake pulse, the tracking error signal is again supplied to the actuator 13 and the equaliziing characteristic of the digital equalizer 9 is changed when the negative peak of the tracking error signal signal detected by the peak detector 8. Within the time period $T_a$ in which the equalizing characteristic is changed from a normal characteristic, the lock in of the servo loop occurs.

In the control system in which the differential component is principal as in the state explained above, if it is assumed that the light spot S1 for reading information is moved while the tracking servo loop is closed, the tracking error signal after passing through the equalizer 9 causes the deceleration operation against the actuator 13 during periods C and E shown in FIG. 2B, and causes the acceleration operation against the actuator 13 during a period D shown in FIG. 2B. Therefore, by switching the integration and differential coefficients $K_I$ and $K_D$ of the equalizer 9 to the values $K_{I2}$ and $K_{D2}$ by which the differential component plays a primary part of the compensation operation at the timing of the detection of the peak value, the lock in of the servo loop will take place while the deceleration force is working on the actuator 13. Thus, the stability of the lock in of the servo loop is increased. Under this condition, the gain boost effect for the low frequency range is reduced since the integration coefficient $K_I$ is made small. This means that the loop gain in the low frequency range is reduced as compared with the normal period as illustrated by the dashed line in FIG. 4. However, since the time required for the lock in of the servo loop is relatively short, the reduction in the gain in the low frequency range has practically no effect on the operation of the system. In FIG. 4, the solid line illustrates the characteristic in the normal playback period.

When the aforementioned predetermiend time period has elapsed, the integration and differential coefficients $K_I$ and $K_D$ of the digital equalizer are reverted to the values $K_{I1}$ and $K_{D1}$ respectively, so that the control operation in which the integration component plays the primary part. Thus, the traceability of the pickup against the eccentricity of the disc is assured.

It will be appreciated from the foregoing, according to the present invention, the system is constructed such that the integration coefficient of the equalizer is made smaller and the differential coefficient of the equalizer is made larger during a predetermined time period after the closing of the servo loop at a track jump operation, as compared with the normal playback period. Thus, the servo loop can be locked in when the decelerating force is exerted on the actuator. In this way, the lock in of the servo loop in the track jump operation is attained in the stable and certain manner.

What is claimed is:

1. A tracking servo system for use in an information recording disc playing system having a pickup, comprising:

tracking error signal generating means for generating a tracking error signal in accordance with an amount of shift of an information reading spot of said pickup with respect to a recording track formed on said disc, in a radial direction of said disc;

drive means for deflecting said information reading spot in said radial direction of said disc;

equalizing means connected to said tracking error signal generating means for compensating a frequency characteristic of said tracking error signal and producing an output signal, said equalizing means having an integration coefficient and a differential coefficient which determine an equalizing characteristic of said equalizing means;

a loop switch disposed between said equalizing means and said drive means for switching the transmission of said output signal of said equalizing means to said drive means; and control means for stopping the transmission of said output signal of said equalizing means to said drive means in response to a jump command for a track jump operation by which said information reading spot moves from a recording track section to another recording track section, and for resuming the transmission of said output signal of said equalizing means to close a servo loop at a desirable timing during said track jump operation, wherein said control means is further operative to make said integration coefficient smaller than its value under a normal playing condition of said disc playing system and make said differential coefficient larger than its value under said normal playing condition thereby changing said equalizing characteristic of said equalizing means for a predetermined time period after the resumption of the transmission of said output signal of said equalizing means, to close said servo loop.

2. A tracking servo system as set forth in claim 1, wherein said predetermined time period is determined to be longer than a time period required for a lock in of the servo loop after the resumption of the supply of the tracking error signal to close the servo loop.

3. A tracking servo system for use in an information recording disc playing system having a pickup, comprising:

tracking error signal generating means for generating a tracking error signal in accordance with an amount of shift of an information reading spot of said pickup with respect to a recording track formed on said disc, in a radial direction of said disc;

drive means for deflecting said information reading spot in said radial direction of said disc;

equalizing means connected to said tracking error signal generating means for compensating a frequency characteristic of said tracking error signal and producing an output signal;

loop switch disposed between said equalizing means and said drive means for switching the transmission of said output signal of said equalizing means to said drive means; and control means for stopping the transmission of said output signal of said equalizing means to said drive means in response to a jump command for a track jump operation by which said information reading spot moves from a recording track section to another recording track section, and for resuming the transmission of said output signal of said equalizing means to close a servo loop at a desirable timing during said track jump operation, wherein said control means is further operative to change an equalizing characteristic of said equalizing means for a predetermined time period after the resumption of the transmission of said output signal of said equalizing means to close said servo loop, and includes means for generating a jump pulse of a predetermined duration to be supplied to said drive means through said loop switch in response to said jump command, means for generating a brake pulse of a predetermined duration to be supplied to said drive means through said loop switch, means for detecting a zero-crossing of said tracking error signal, and means for detecting a peak of said tracking error signal and wherein said control means supplies said jump pulse to said drive means through said loop switch in response to said jump command and supplies said brake pulse to said drive means through said loop switch when a zero-crossing of the tracking error signal is detected after an extinction of said jump pulse signal, and resumes the supply of the tracking error signal to the drive means through said loop switch and changes the equalizing characteristic of said equalizing means when a peak of said tracking error signal is detected after an extinction of said brake pulse.

* * * * *